United States Patent
Inagaki

(12) 
(10) Patent No.: US 6,260,977 B1
(45) Date of Patent: Jul. 17, 2001

(54) STAY FOR DOOR MIRROR

(75) Inventor: Bunji Inagaki, Niwa-gun (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 09/436,254

(22) Filed: Nov. 9, 1999

(30) Foreign Application Priority Data

Nov. 16, 1998 (JP) .................................................. 10-325046

(51) Int. Cl.$^7$ .................................................. G02B 7/182
(52) U.S. Cl. .................... 359/879; 359/880; 359/871; 359/872; 359/846
(58) Field of Search ................................. 359/879, 880, 359/871, 872, 846

(56) References Cited

U.S. PATENT DOCUMENTS 5,083,834 * 1/1992 Moffatt et al. ....................... 296/190
5,640,282 * 6/1997 Ise et al. .............................. 359/846
5,881,342 * 3/1999 Makino et al. ...................... 399/167

* cited by examiner

Primary Examiner—Mohammad Sikder
(74) Attorney, Agent, or Firm—Birch, Stewart, Kolasch & Birch, LLP

(57) ABSTRACT

A door mirror stay which has a mount plate which is fixed along a door panel, a mirror support which is supported by the mount plate and which supports a mirror unit, and a porous member which is integrally formed with the mount plate, the porous member covering a mount surface of the mount plate. This integrally formed porous member has a function to seal and protect the mount surface. The number of parts of the stay and in turn the number of working steps can be decreased, so that the manufacturing cost can be more lowered than the conventional. In the present invention, the door mirror stay can be a one-piece type stay, or a two-piece type stay. In two-piece type stay, an air flow is prevented from entering the automobile through the gaps between each pieces, so that the wind noise can be lowered.

3 Claims, 7 Drawing Sheets

STAY FOR DOOR MIRROR

BACKGROUND OF THE INVENTION

1. Field of the Invention

The present invention relates to a stay for a door mirror which is used for attaching the door mirror to a door panel of an automobile.

2. Description of the Related Art

As a stay for a door mirror of an automobile, conventionally, there have been known a one-piece type stay and a two-piece type one.

FIG. 1 is a schematic perspective view of such a one-piece type stay 10. The stay 10 has a triangular mount plate 11 which is fixed on a door panel of the automobile, and a mirror support 12 which is laterally projected from the mount plate 11 and supports a mirror unit 50 (FIG. 2). On the mirror support 12, there are provided a plurality of bosses 13 for fixing the mirror unit 50.

Ordinarily in this kind of one-piece stay, as shown in FIG. 2, a seal member 30 is fixed to a mount surface 11a, against the door panel, of the mount plate 11 by a double coated adhesive tape (double-sided adhesive tape). Further, a porous member 40 is fixed to the seal member 30 also by a double coated adhesive tape.

The seal member 30 is made of vinyl chloride (PVC), rubber and so on. The seal member 30 prevents a wind from blowing into the stay, or prevents a water from entering the stay. On the other hand, the porous member 40 can be elastically deformed to some extent, and is sandwiched between the stay and the door panel so as to further seal the inside of the stay with its elasticity.

The reason why the seal member 30 and the porous member 40, both are intended for sealing, are separately provided are as follows. It is necessary to surely seal the complicated configuration of the mount surface 11a of the mount plate 11, where the bosses for screwing and so on are provided. The following is also another reason. That is, the porous member 40 is generally formed by stamping from a sheet-like material, and therefore it can not effectively seal the complicated mount surface 11a.

In the above conventional constitution, two members of the seal member 30 and the porous member 40 must be fixed to one stay. Further, the seal member 30 and the porous member 40 are fixed with the double coated adhesive tape. Thus, the many parts are necessary, and therefore its assembling steps are increased in number. As a result, the manufacturing cost goes up.

FIG. 3 is a schematic perspective view of the abovementioned two-piece type stay 20. The stay 20 comprises a base 20a made of metal which provides necessary strength for the stay, and a base cover 20b made of resin which covers the base 20a from outside. The base 20a is provided with a projecting portion 22 which is laterally projected from a base plate 21. On the other hand, the base cover 20b is provided with a projecting portion 26 which is laterally projected from a triangular base plate 25. An opening 27 is formed at a region where the base plate 25 and the projecting portion 26 are connected with each other.

The projecting portion 22 of the base 20a is passed through the opening 27 so that the base 20a and the base cover 20b are connected with each other. Thus, the stay 20, which is similar to the stay 10 in FIG. 1, is assembled. The base plates 21 and 25 are integrated so as to form a portion corresponding to the mount plate 11 of the stay 10 in FIG. 1. The projecting portions 22 and 26 are integrated so as to form a portion corresponding to the mirror support 12 of the stay 10. On the projecting portions 22 of the base 20a, there are provided a plurality of bosses 23 for fixing the mirror unit.

Also in the two-piece type stay 20, like in the case of the one-piece type stay, there arises a problem of higher manufacturing cost due to using two members of the seal member and the porous member. Further, in the two-piece type stay, a wind-causing noise problem (i.e. occurrence of whistler, or of whistling sound) additionally arises, which will be explained below with reference to FIG. 4. FIG. 4 is a schematic sectional view taken along a 4—4 line in Fig, 3, wherein the stay is attached to the door panel of the automobile.

In FIG. 4, the mirror unit is not shown. A door panel 51, shown with an imaginary line, is one located at the most indoor side. Actually, other door panels also exist at outdoor side (stay side), and the constitution is complicated. Between the door panels and the seal member 30, a compressed porous member is sandwiched so as to perform sealing therebetween (in FIG. 4, the compressed porous member is not shown). Further, another decorative panel (not shown) is attached at the indoor side of the door panel 51.

In the two-piece type stay, air flows through a gap between two pieces. That is, air flows in from the gaps shown in FIG. 4 (arrows A and B), and this air flow leaks into the automobile thorough an opening 31 formed on the seal member 30 (see an arrow C), causing uncomfortable wind noise to the driver. The opening 31 is formed at a location corresponding to a female tapped hole 21a which is formed on the base plate 21 and receives a screw (not shown) used for fixing the stay to the door panel. Although, in FIG. 4, for the sake of clear explanation, the gaps between the stay and the seal member 30 are largely shown for overstatement, actual gaps are more narrow. But, the air flow enters the automobile through such narrow gaps under its wind pressure.

SUMMERY OF THE INVENTION

It is therefore an object of the present invention to provide a stay for door mirror wherein an effective sealing can be achieved with less number of parts, and even in the case of two-piece type one, wind noise problem can not arise.

In accomplishing this and other objects of the present invention, the first aspect of the present invention provides a stay for a door mirror, comprising: a mount plate which is fixed along a door panel; a mirror support which is supported by the mount plate and which supports a mirror unit; and a porous member which is integrally formed with the mount plate, the porous member covering a mount surface of the mount plate.

This stay is one-piece type stay, like in the conventional stay in FIGS. 1 and 2. This stay has a different point from the conventional stay in a point of view that a porous member, which covers a mount surface of the mount plate, is integrally formed with the mount plate (namely, with the stay). This integrally formed porous member has a function to seal and protect the mount surface. Therefore, in the stay of the present invention, the seal member which has been required conventionally is not necessary. Further, the double coated adhesive tape for fixing each member can be omitted. Thus, the number of parts and in turn the number of working steps can be decreased, so that the manufacturing cost can be more lowered than the conventional.

The second aspect of the present invention provides a stay for a door mirror, comprising: a base made of metal which provides a predetermined strength required for the stay, wherein the base comprises a mount plate which is fixed along a door panel, and wherein the base further comprises a mirror support which is supported by the mount plate and which supports a mirror unit; a base cover made of resin which covers the base; and a porous member which is formed integrally with both the base and the base cover, the porous member filling in a gap between the base and the base cover, and the porous member covering a mount surface of the mount plate.

Further, the third aspect of the present invention provides a stay for a door mirror, comprising: a base made of metal which provides a predetermined strength required for the stay, wherein the base comprises a mount plate which is fixed along a door panel, and wherein the base further comprises a mirror support which is supported by the mount plate and which supports a mirror unit; a base cover made of resin which covers the base; and a porous member which is formed integrally with the base, the porous member filling in a gap between the base and the base cover, and the porous member covering a mount surface of the mount plate.

In the stay for door mirror provided by the second or third aspect of the present invention, a porous member is formed integrally so that it not only covers a mount surface of the mount plate like in the above one-piece type one, but also fills in gaps between the base and the base cover. Thus, not only the manufacturing cost is lowered, but also air flow is prevented from entering the automobile through the gaps between each pieces, so that the wind noise can be lowered.

BRIEF DESCRIPTION OF THE DRAWINGS

This and other objects and features of the present invention will become apparent from the following description taken in conjunction with the preferred embodiments thereof with reference to the accompanying drawings, in which.

DETAILED DESCRIPTION OF THE PREFERRED EMBODIMENT

Figure 1:
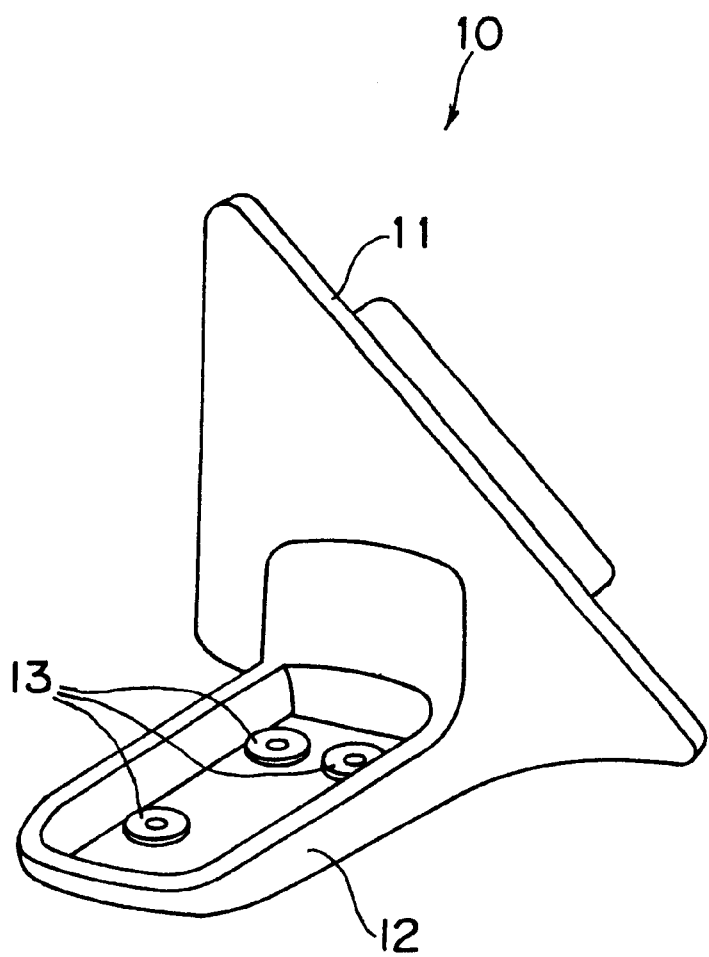
FIG. 1 is a schematic perspective view showing a conventional one-piece type stay.
Figure 2:
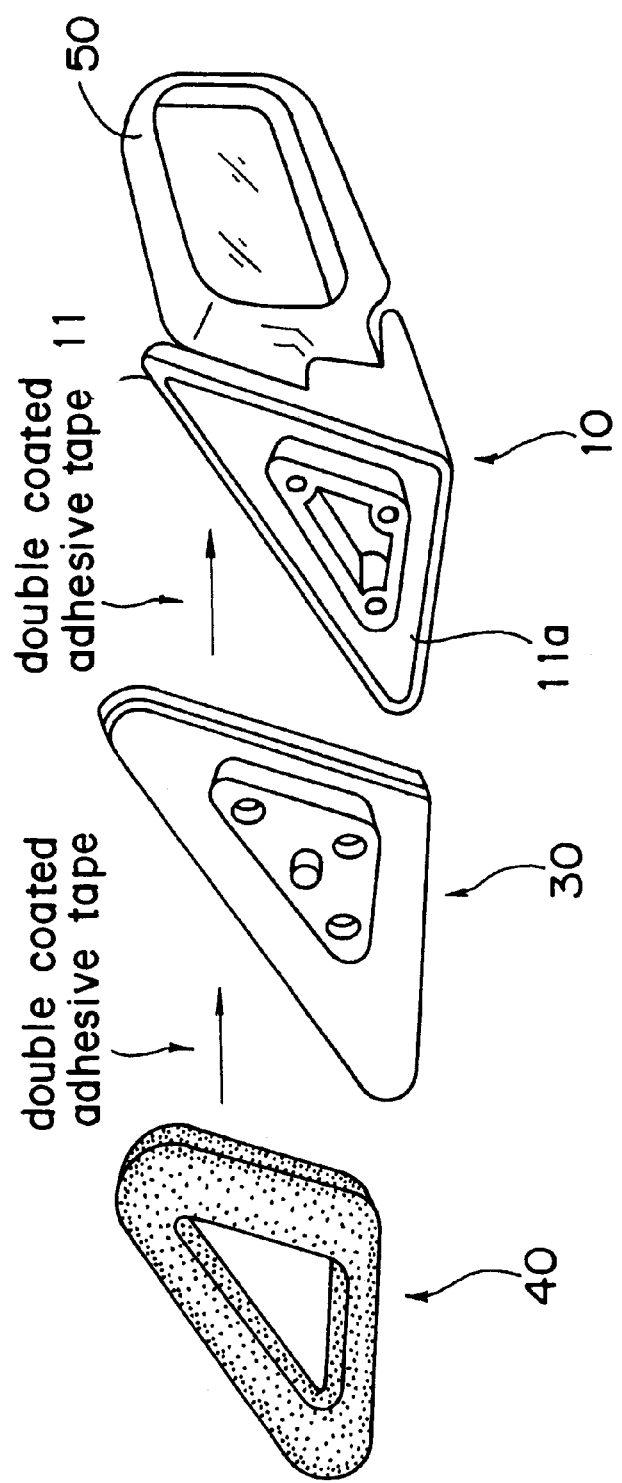
FIG. 2 is a schematic exploded perspective view explaining a seal member and a porous member fixed to the stay in FIG. 1.

Before the description of the embodiments proceeds, it is to be noted that like or corresponding parts are designed by like reference numerals throughout the accompanying drawings.

Hereinafter, the embodiments of the present invention will be explained in detail with reference to the attached drawings.

Figure 4:
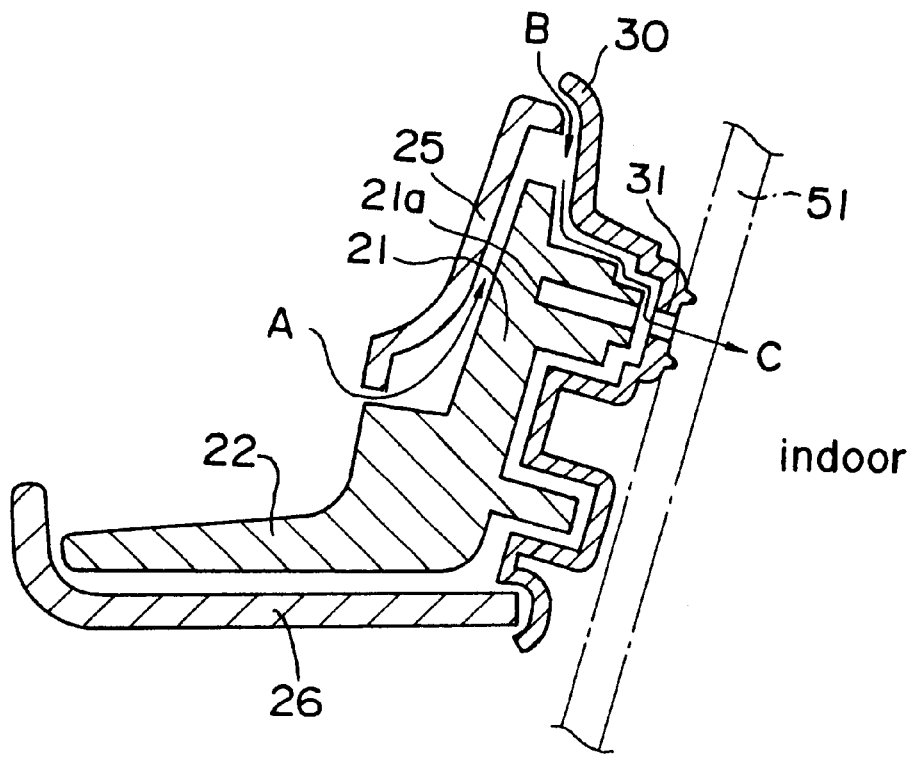
FIG. 4 is a sectional view showing the stay in FIG. 3, wherein the stay is attached to a door panel.
Figure 5:
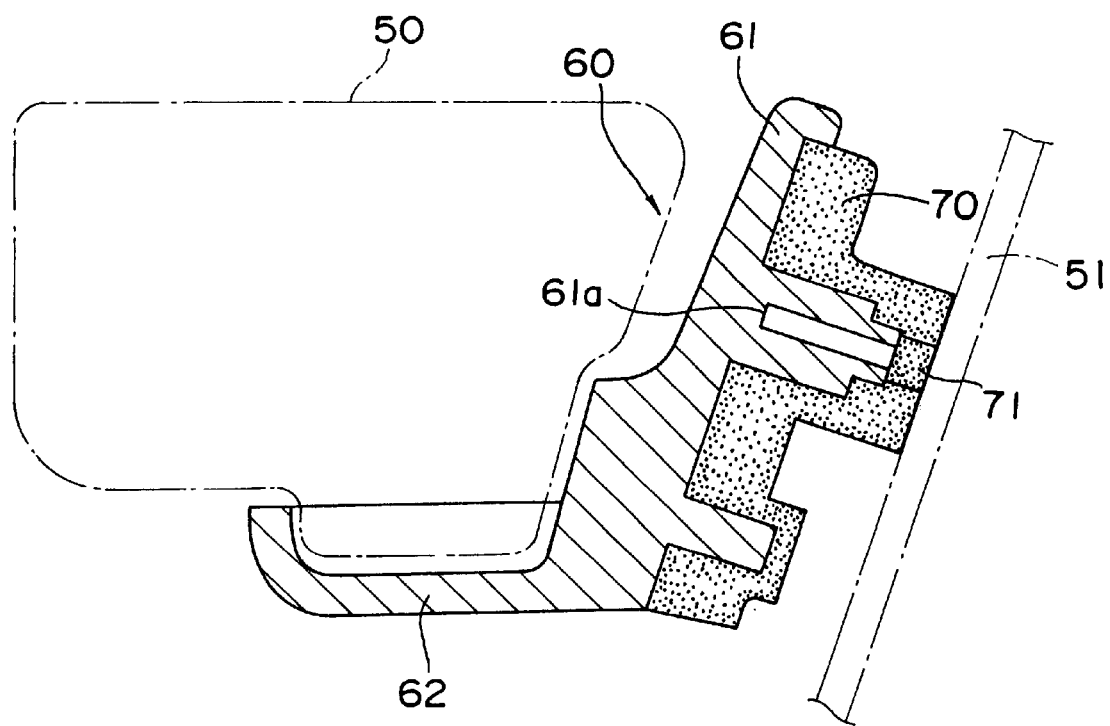
FIG. 5 is a sectional view showing an one-piece type stay according to an embodiment of the present invention, at a plane corresponding to that in FIG. 4.

FIG. 5 shows a stay for a door mirror according to a first embodiment of the present invention. FIG. 5 shows the stay in a sectional view at a plane corresponding to that in FIG. 4 showing a prior art. A mirror unit 50 and a door panel 51 are shown by imaginary line, respectively.

The stay in FIG. 5 is a one-piece type stay, and has the same basic constitution as the conventional stay in FIG. 1, in point of view that it has a mount plate 61 and a mirror support 62. But, the stay 60 can be distinguished from the stay in FIG. 1, in point of view that a porous member 70 is integrally formed with the mount plate 61 (or, with the stay).

Such an integrated constitution can be achieved by using an insert molding. That is, the one-piece stay 60, which has been formed by another step, is previously inserted in a die, which is used for injection molding or foaming of the porous member 70 such as rubber, urethane, and polyethylene. Then, injection molding or foaming is performed in the die.

Figure 6:
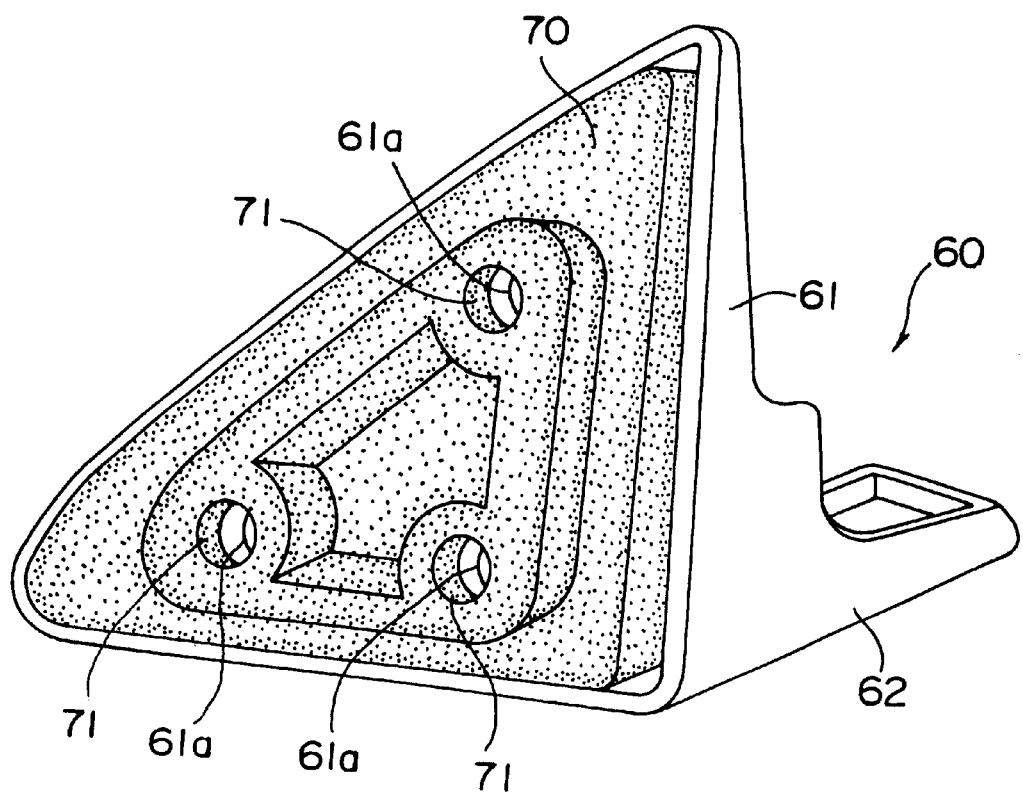
FIG. 6 is a perspective view showing the porous member integrally formed with the stay of FIG. 5 so as to cover the mount surface of the stay.

As shown in FIG. 6, the porous member 70 covers the whole mount surface of the mount plate 61 and is integrally formed therewith, so that the porous member 70 can seal the mount surface. In FIGS. 5 and 6, a reference number 61a denotes a female tapped hole which receives a screw used for fixing the stay to the door panel 51. An opening 71 is formed on the porous member 70 at a location corresponding to the female tapped hole 61a.

Figure 7:
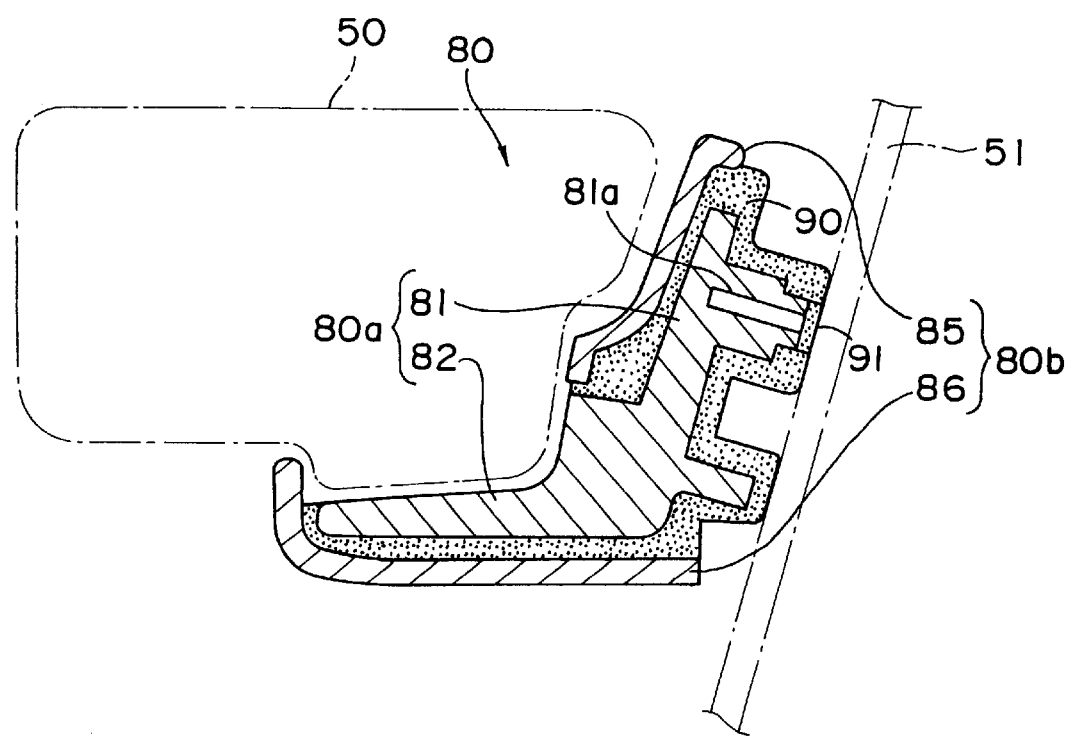
FIG. 7 is a sectional view showing a two-piece type stay according to another embodiment of the present invention, at a plane corresponding to that in FIG. 4.

FIG. 7 shows a stay for a door mirror according to a second embodiment of the present invention. FIG. 7 shows the stay in sectional view at a plane corresponding to that in FIG. 4 showing the prior art. A mirror unit 50 and a door panel 51 are shown by imaginary line, respectively.

Figure 3:
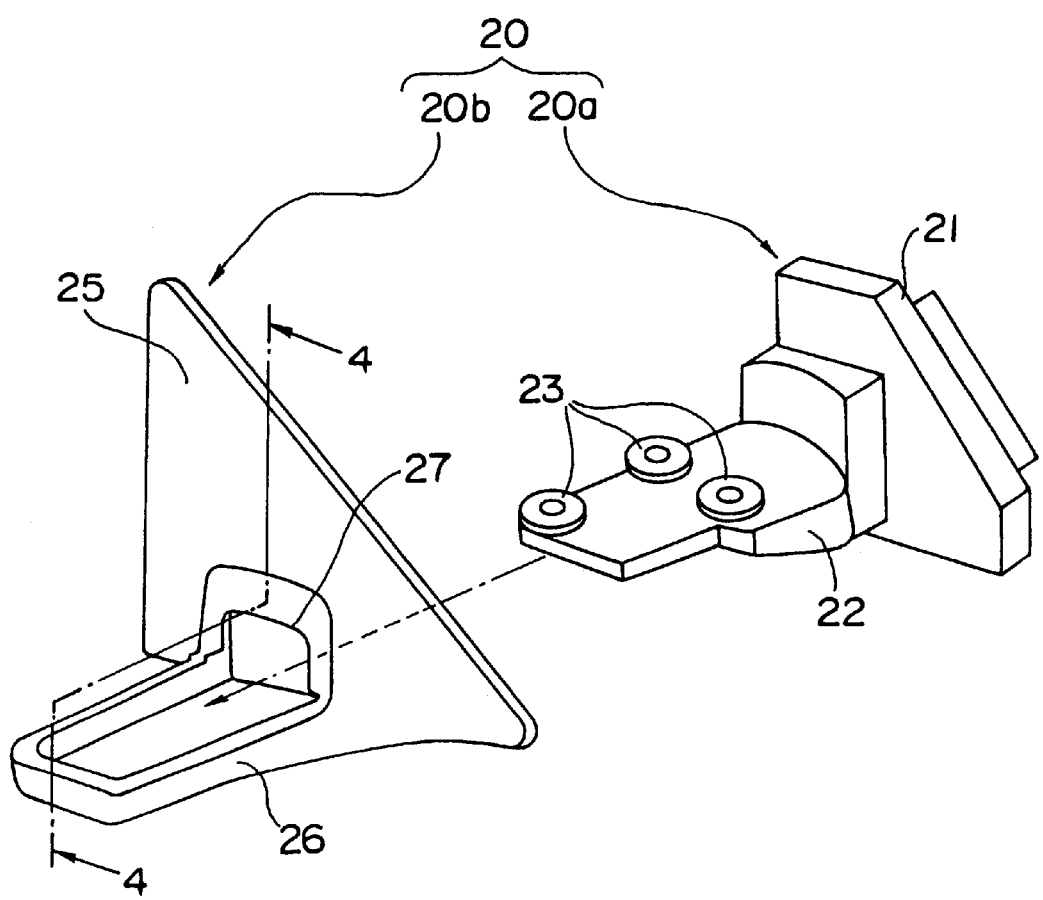
FIG. 3 is a schematic perspective view showing a conventional two-piece type stay.

The stay in FIG. 7 is a two-piece type stay, and has the same basic constitution as the conventional stay in FIG. 3, in point of view that it has a base 80a made of metal and a base cover 80b made of resin. The base 80a is provided with a projecting portion 82 which is laterally projected from a base plate 81. On the other hand, the base cover 80b is provided with a projecting portion 86 which is laterally projected from a base plate 85.

The stay in FIG. 7 has the following different point from the conventional two-piece type stay shown in FIGS. 3 and 4. In the stay in FIG. 7, a porous member 90 is formed integrally with the stay, and the porous member 90 fills in gaps between the base 80a and the base cover 80b, and covers the mount surface. Other basic constitution of the stay in FIG. 7 is the same as that in the conventional one.

When the present invention is applied to the two-piece type stay, the porous member 90 can be integrally formed with the base 80a, and then the base 80a can be assembled with the base cover 80b. Alternatively, the porous member 90 can be integrally formed with both the base 80a and the base cover 80b simultaneously. That is, in the die used for injection molding or foaming of the porous member 90, the base formed by another step is solely inserted, or the base and base cover each formed by another step are both inserted, and then the molding of the porous member 90 is performed.

The porous member 90 has a sealing function like in the case that it is applied to the one-piece stay. Further, since the porous member 90 fills in the gaps between the two pieces (namely, the base 80a and the base cover 80b), the porous member 90 has a function to prevent the occurrence of wind noise, which would occur when the air flows into the automobile through the gaps.

As a method for forming the porous member integrally with the stay, utilizing a "two-color molding" other than the injection molding. That is, after the one-piece type stay or the base of the two-piece type stay is formed in a die, and before parting the die, only a part of the die is exchanged.

Then, in a newly appeared space in the die, the porous member is formed by injection molding or foaming.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A stay for a door mirror, comprising:
    a mount plate which is fixed along a door panel;
    a mirror support which is supported by the mount plate and which supports a mirror unit;
    a porous member which is integrally formed with the mount plate, the porous member covering a mount surface of the mount plate;
    an aperture formed in said mounting plate for securing said mounting plate to a door panel; and
    an opening formed in said porous member for aligning with said aperture formed in said mounting plate for securing said mounting plate to a door panel.

2. The stay according to claim 1, wherein said porous member is constructed of urethane.

3. The stay according to claim 1, wherein said porous member is constructed of polyethylene.

* * * * *